(12) United States Patent
Werfring et al.

(10) Patent No.: US 11,760,523 B2
(45) Date of Patent: Sep. 19, 2023

(54) BAG EMPTIER DEVICE

(71) Applicant: LOGISTIK WERFRING GMBH, Mannswörth (AT)

(72) Inventors: Marc Werfring, Mannswörth (AT); Hans-Joachim Werfring, Mannswörth (AT)

(73) Assignee: LOGISTIK WERFRING GMBH, Mannswörth (AT)

( * ) Notice: Subject to any disclaimer, the term of this patent is extended or adjusted under 35 U.S.C. 154(b) by 98 days.

(21) Appl. No.: 17/268,556

(22) PCT Filed: Aug. 19, 2019

(86) PCT No.: PCT/EP2019/072150
§ 371 (c)(1),
(2) Date: Feb. 15, 2021

(87) PCT Pub. No.: WO2020/038890
PCT Pub. Date: Feb. 27, 2020

(65) Prior Publication Data
US 2021/0309404 A1 Oct. 7, 2021

(30) Foreign Application Priority Data
Aug. 21, 2018 (AT) .............................. A 50708/2018

(51) Int. Cl.
*B65B 69/00* (2006.01)
*B25J 9/00* (2006.01)
(Continued)

(52) U.S. Cl.
CPC ......... *B65B 69/0008* (2013.01); *B25J 9/0093* (2013.01); *B26D 1/06* (2013.01); *B66F 9/02* (2013.01); *B65G 67/04* (2013.01)

(58) Field of Classification Search
CPC .............. B65B 69/0008; B65B 69/0033; B25J 9/0093; B25J 15/0028; B25J 15/0061;
(Continued)

(56) References Cited

U.S. PATENT DOCUMENTS 3,757,973 A * 9/1973 Lambert ............. B65B 69/0008
414/412
3,884,375 A * 5/1975 Schott, Jr. ........... B65B 69/0008
414/412

(Continued)

FOREIGN PATENT DOCUMENTS

DE    3643076 C1    7/1988
DE    8633746 U1   7/1989
(Continued)

*Primary Examiner* — Glenn F Myers
(74) *Attorney, Agent, or Firm* — NGUYEN TARBET LLC

(57) ABSTRACT

The invention relates to a device for processing dust- and substantially air-tight sacks (1) filled with flowable or free-flowing materials, and for separating the sack material from the sack contents via a collection device (8), wherein the device comprises a sack supply track (4) with a sack removal point (56), a manipulation device (6) with a lifting frame (9) for picking up the filled sacks (1), a sack slitting device (16) for opening the filled sacks (1), a collection device (8) for collecting the sack contents, an empty sack store (12), and an empty pallet store (13).

18 Claims, 5 Drawing Sheets

(51) Int. Cl.
  *B26D 1/06* (2006.01)
  *B66F 9/02* (2006.01)
  *B65G 67/04* (2006.01)

(58) Field of Classification Search
  CPC .......... B25J 15/0071; B26D 1/06; B66F 9/02;
           B66F 9/18; B66F 9/181; B66F 9/183;
           B65G 67/04; B65G 67/06; B65G 67/08
  See application file for complete search history.

(56) References Cited

U.S. PATENT DOCUMENTS

| | | | |
|---|---|---|---|
| 6,471,767 B1 * | 10/2002 | Konczak | C04B 22/146 |
| | | | 106/739 |
| 2005/0019141 A1 * | 1/2005 | De Baat | B65B 69/0033 |
| | | | 414/412 |
| 2017/0099803 A1 * | 4/2017 | Neighbors | A01K 29/005 |

FOREIGN PATENT DOCUMENTS

| | | |
|---|---|---|
| DE | 9405456 U1 | 6/1994 |
| EP | 2821128 A1 | 1/2015 |
| EP | 3181468 A1 | 6/2017 |

* cited by examiner

BAG EMPTIER DEVICE

CROSS REFERENCE

This application is a 371 and claims benefit of PCT/EP2019/0721.50 filed Aug. 19, 2019, which claims benefit of AT Patent Application No. A 50708/2018 filed Aug. 21, 2018, the specification(s) of which is/are incorporated herein in their entirety by reference.

The invention relates to a device according to the preamble of the independent patent claims.

Various methods and devices for emptying filled bags are known from the state of the art.

For example, methods are known where the bags are cut open manually and then emptied manually. In such methods, each bag must be lifted, cut open and emptied by a person. Furthermore, methods and devices are known where the filled bags are first cut open manually and then fed into a drum device. By rotating the drum of the drum device, the emptied product falls into an emptying funnel and the packing material moves through the drum into the outlet.

However, a disadvantage of such methods is that the drum is easily clogged by the bag material and the emptied product is contaminated by parts of the bag material. Furthermore, the known devices are space-consuming and are difficult to integrate in existing systems for the production of granules or powders.

The object of the invention is to overcome the disadvantages of the state of the art. In particular, it is an object of the invention to provide a method and a system with which filled bags can be emptied easily, quickly, cost-effectively and in an automated manner.

Furthermore, it is an object of the invention to prevent contamination of the emptied bag contents with parts of the bag material.

Furthermore, it is an object of the invention to design the device in such a way that it is compact and space-efficient and can be operated with few operating personnel. With the device according to the invention, it should be possible to meet the high quality requirements with regard to contaminations that apply, for example, in the pharmaceutical industry for feedstock.

The object according to the invention is solved in particular by the features of the independent patent claim 1.

The invention relates to a device for handling dust-tight and substantially air-tight bags filled with free-flowing or flowable materials and for separating the bag material from the contents of the bag above a collecting device.

According to the invention, it is provided that the filled bags comprise
 a bag feed track with a bag pick-up point,
 a manipulation device with a lift frame for grasping the filled bags,
 a bag slitting device for opening the filled bags,
 a collecting device for collecting the contents of the bag,
 an empty bag deposit, and
 an empty pallet deposit
in the area of the device.

The lift frame and its bag gripping devices are configured to grasp a plurality of filled bags, wherein hook-shaped bag grippers are provided for each bag.

The bag gripping device comprises at least four hook-shaped bag grippers for each bag. Preferably, the bag grippers can be moved from a transport position into an operating position, wherein, in the operating position, the bag grippers engage the bags grasped by the manipulation device, and wherein, in the transport position, the bag grippers are free of bags.

The bag gripping device may have a stripping device for each bag gripper.

Preferably, the manipulation device comprises an industrial robot movable about a plurality of axes.

The bag feed track may have a conveyor belt for receiving the bags or for receiving the pallets carrying the bags and, optionally, a centering device centering the fed pallets. Optionally, the bag slitting device comprises a cutting frame and cutting knife arrangements, which are preferably arranged in an H-shape. Furthermore, the collecting device may comprise a collecting funnel.

The device may be characterized
 in that a filter device is provided below the bag slitting device to collect any lost bag material,
 in that bag material monitoring devices are provided on the bag slitting device to detect the lost bag material,
 and in that the filter device is designed as a mesh grid, in particular having a mesh size in the range of 5 to 25 mm, preferably 16 mm.

The empty bag deposit preferably comprises an empty bag deposit funnel, and a bag compressing device, which compresses the empty bags, may be provided below the empty bag deposit.

Preferably, a pallet gripping device is provided on the lift frame of the manipulation device, and the pallet gripping device comprises at least one, in particular two, pallet gripper/s. The pallet gripping device can be moved from a transport position into an operating position, wherein, in the operating position, the pallet grippers of the pallet gripping device engage the substantially bag-free pallet for conveying the pallets, and wherein, in the transport position, the pallet grippers of the pallet gripping device are free of pallets.

According to the invention, the device may be arranged or is arranged on a platform together with the bag feed track, the bag pick-up point, the manipulation device, the bag slitting device, the collecting device, the empty bag deposit and the empty pallet deposit. Preferably, the platform is configured to allow a transport device, in particular a tank truck, to move into and through it.

Preferably, the lift frame has a number of bag gripping devices, which corresponds to the number of bags to be grasped at a time.

The bag gripping devices each have a respective bag receiving plate, which corresponds to the outer dimensions of the bags, on the mounting side of which are arranged an actuating shaft for the connection to the manipulation device and actuating elements for the bearing and movement of the bag grippers and the pallet gripping device.

The bag receiving plates may have inspection openings.

Advantageously, the bag grippers are hook-shaped and are designed to have a circular cross section at least in the tip region, which penetrates the bags.

Optionally, cut-outs acting as stripping devices for the passage of the bag grippers are provided on the edges of the bag receiving plate.

A filler neck may be mounted on the collecting device, wherein a shutoff device may be provided between the collecting device and the filler neck.

Preferably, the free-flowing or flowable substance/material is packed in substantially dust-tight and largely airtight bags. The material contained in the bags may be conveyed to the bag pick-up point via the bag feed track, in particular a conveyor belt. Unlike in conventional methods, the filled bags can be grasped by the lift frame of the manipulation device in an automated manner in the area of the bag pick-up point. The lift frame may optionally lift a plurality of filled bags, in particular two or more, in particular five, filled bags at a time.

Then, the grasped bags can be brought into contact with a cutting frame of the bag slitting device, which comprises at least one cutting knife. It may in particular be provided that the grasped bags are put onto the cutting knives by the manipulation device. The cutting knives of the bag slitting device may be configured to open the filled bags and in particular to cut open the bag material.

After opening the filled bags, in particular after cutting open the bag material, the contents of the bag, driven by gravity, exit the bag material downwards towards the ground. Preferably, it may be provided that a collecting device is arranged below the bag slitting device, which receives the exiting contents of the bag for further processing or manipulation.

It may be provided that the collecting device conveys the contents of the bag into a transport device, such as in particular a silo truck, a lorry, a tank wagon, an octabin or transport bags (big bags). In particular, it may be provided that the collecting device is arranged below the bag slitting device and that the transport device is arranged below the collecting device.

Optionally, it is provided that the method steps follow each other as described above. That optionally means that first the filled bags are conveyed to a bag pick-up point. Then, the filled bags are grasped by a manipulation device and the grasped bags are brought into contact with a bag slitting device, whereby the contents of the bag are discharged into a collecting device. Alternatively, the device may provide for the filled bags to be grasped by at least one suction device of the lift frame of the manipulation device and held against the lift frame by negative pressure, the negative pressure being generated by a negative pressure source connected to the suction device.

Optionally, it is provided that at least one, in particular five, suction devices are provided on the lift frame. The suction devices may be configured to grasp the filled bags in the area of the bag pick-up point and to hold them against the lift frame in particular by negative pressure.

In particular, it may be provided that the suction devices come into contact with the filled bags in the area of the bag pick-up point. Once contact is made, a negative pressure can be created by the negative pressure source, whereby the filled bags, in particular the bag material, may be drawn in by the suction devices. Then, the bags drawn in in by the suction devices may be lifted and conveyed to the bag slitting device.

Optionally, it is provided that, in order to compact the bags, air is sucked out of the grasped bags by means of a suction device provided on the lift frame of the manipulation device, and/or that air is passively or actively supplied again to the grasped and compacted bags before or when the bags are brought into contact with the bag slitting device.

By means of the suction devices, the air can be removed, in particular sucked, from the grasped bags and/or the bags to be grasped. This may allow the bags to be compacted and the contents of the bag to be compressed. This compaction or compression can reduce an unintentional displacement of the bag contents of the bags during transport of the bags on the lift frame of the manipulation device and thereby prevent an unintentional detachment of the bags from the lift frame.

The suction devices are optionally connected to a or the negative pressure source. Before the bags are brought into contact with the bag slitting device, in particular with the cutting knives of the bag slitting device, air may be passively or actively supplied to the compacted bags.

In particular, it may be provided that the suction devices comprise a suction mandrel, which penetrates the filled bags to suck the air out and pierces the bag material of the respective filled bag. This suction mandrel can be removed from the filled bags before the filled bags are brought into contact with the bag slitting device. This allows air to re-enter the filled bags through the hole in the bag material, which was formed by the suction mandrel upon piercing the bag material.

Preferably, the suction device with the suction mandrel is designed in such a way that substantially only the air contained in the filled bags can be sucked out without material. This can ensure that the compaction and/or compression of the filled bags takes place without loss of material.

Optionally, it is provided that multiple, in particular four or eight, bag grippers of a bag gripping device, which is provided on the lift frame of the manipulation device, engage each of the grasped bags before or when the bags are brought into contact with the bag slitting device, whereby the bag material is held against the lift frame of the manipulation device during emptying, and that the emptied bags, in particular only the bag material of the grasped bags, is/are conveyed to an empty bag deposit.

The bag grippers can prevent the bag material from being separated from the lift frame and from contaminating or polluting the bag contents exiting the bag material. With the method, contamination can be substantially prevented, whereby the high demands placed on product purity by the pharmaceutical industry, for example, can be met.

Optionally, it is provided that the filled bags are conveyed to the bag pick-up point on a conveyor belt on pallets, that pallet grippers of a pallet gripping device, which is provided on the lift frame of the manipulation device, engage the empty or substantially bag-free pallets, and that the pallets thus grasped are conveyed to an empty pallet deposit.

The filled bags can be conveyed to the bag pick-up point on a conveyor belt, in particular on pallets. Preferably, it may be provided that the bags are arranged in several, for example ten, layers of five bags on each of the pallets. The lift frame may be arranged to grasp one complete layer of bags at a time. In particular, the number of suction devices may correspond to the number of bags per layer.

Once all layers of bags have been removed from the pallet, the bag-free pallet can be grasped by at least one pallet gripper. In particular, at least one pallet gripping device with at least one, preferably two, pallet grippers is provided on the lift frame. The pallet grasped by the pallet grippers is then conveyed to the empty pallet deposit. By removing the bag-free pallet from the conveyor belt, a subsequent pallet loaded with bags can move up, whereby the bags of the moving-up pallet are conveyed into the area of the bag pick-up point.

The lift frame may in particular be made of a stainless material, such as in particular steel or stainless steel.

Optionally, it is provided that the lift frame of the manipulation device comprises at least one suction device or a number of suction devices, which corresponds to the number of bags to be grasped, for grasping the filled bags, that the suction device/s is/are connected to a negative pressure source, and that each suction device comprises a plurality of suction holes.

In particular, the lift frame comprises two or more, in particular five, suction devices. In particular, the number of suction devices may correspond to the number of bags per layer.

It may be provided that each suction device comprises a plurality of suction holes, which are connected to a negative pressure source. The negative pressure can be generated by an electric vacuum pump, for example. As soon as the suction device is in contact with the filled bags, in particular with the bag material, a negative pressure can be generated by the negative pressure source. This allows the filled bags, in particular the bag material of the bags, to be drawn in by the suction device and held against the lift frame.

In particular, the suction devices may comprise a detection device which detects the presence of filled bags.

Optionally, it is provided that the lift frame of the manipulation device comprises at least one suction device or a number of suction devices, which corresponds to the number of bags to be grasped, for grasping the filled bags, that the suction device's is/are connected to a negative pressure source, that in the area of each suction device a respective suction device is provided for sucking the air out of the grasped bags, the suction device comprising a suction mandrel.

The suction devices may be connected to the or a negative pressure source. This allows the air to be sucked out of the filled bags. Optionally, it is provided that the suction devices are additionally connected to a pressure source, whereby air can be actively supplied to the compacted and compressed bags before or when they come into contact with the bag slitting device.

Optionally, it is provided that the lift frame of the manipulation device comprises at least one suction device or a number of suction devices, which corresponds to the number of bags to be grasped, for grasping the filled bags, that the suction device's is/are connected to a negative pressure source, that a bag gripping device is provided in the area of each suction device, and that the bag gripping device comprises at least one, in particular four, bag grippers.

Optionally, it is provided that the bag gripping device comprises a stripping device and at least one, in particular four, hook-shaped bag grippers.

Optionally, it is provided that the bag grippers can be moved from a transport position into an operating position, that, in the operating position, the bag grippers engage the bags grasped by the manipulation device, and that, in the transport position, the bag grippers are free of bags.

In particular, at least two, in particular four or more, bag grippers may be arranged in each case in the area of the respective suction device. The bag grippers are in particular arranged opposite each other.

Preferably, it may be provided that in the direction of the longitudinal extension of the respective suction device, two or more bag grippers are provided on each side of the respective suction device. This allows the bag grippers to hold the bag material against the lift frame during and after the emptying of the bag contents and contamination of the exiting bag contents can be prevented.

The bag grippers can be bag-free in their transport position, whereby these are arranged in particular behind or after the stripping device on the lift frame. This can prevent obstruction by the bag grippers when the filled bags are grasped by the lift frame. Only when the bag grippers are optionally moved into their operating position, are the bag grippers moved by the stripping device and engage the grasped bags.

In particular, the bag grippers are designed in such a way that they can hold the bag material of the grasped bags against the lift frame during and after the emptying of the bags. This allows the emptied bags, in particular substantially only the bag material, to be transported to the empty bag deposit without loss after the bag contents have been emptied.

In particular, the stripping devices are designed such that the bag material grasped during and after emptying of the bags is completely removed from the bag grippers when the bag grippers are moved from their operating position into their transport position. This can ensure that the bag grippers are free of any bag material in their transport position, which can prevent contamination of the emptied bag material.

Optionally, it is provided that the manipulation device comprises a robot movable about a plurality of axes. In particular, the manipulation device may be an industrial robot, such as a six-axis robot, like an ABB IRB 6620 robot, for example. The robot can be moved about six different axes, which permits the realisation of various functions, such as an efficient lifting, while having a compact design, The robot may, for example, have a movement radius in the range of 1 m to 4 m, in particular 2.2 m. Furthermore, this robot may have a repetition accuracy in the range of 0.01 mm to 0.15 mm, in particular 0.06 mm. The nominal lifting capacity of the robot may be between 50 kg and 250 kg, in particular 100 kg to 200 kg, preferably 150 kg.

Optionally, it is provided that the bag feed track has a conveyor belt for receiving the bags or for receiving the pallets carrying the bags and, optionally, a centering device, which centers the fed pallets.

Optionally, the conveyor belt is designed as a belt assembly conveyor, conveying belt, band conveyor, belt conveyor or conveyor. In particular, the system comprises only one bag feed track.

The centering device may be made of a stainless material, such as in particular steel, galvanized steel or stainless steel. Using the centering device, the pallets may be centered on the conveyor belt. Furthermore, the centering device may comprise a detection device, in particular at least one sensor, which is configured to sense the presence of a pallet with or without bags.

Optionally, it is provided that the bag slitting device comprises a cutting frame and cutting knives, which are preferably arranged in an H-shape.

The bag slitting device, in particular the cutting knives of the bag slitting device, may be designed in such a way that the filled bags, in particular the bag material of the bags, may be cut open. In particular, the cutting frame is made of a stainless material.

At least one, in particular five, cutting knives may be provided on the cutting frame. The cutting knives may be directed with their tips towards the filled bags, which allows the bag material to be cut open easily and quickly. Furthermore, the respective cutting knives may comprise several cutting knife parts.

In particular, it may be provided that the cutting knives are arranged in the area of the cutting frame, which is brought into contact with the grasped filled bags, in an H-shape. Due to the H-shaped arrangement, the respective filled bag, in particular the respective bag material, is cut open in an H-shape, whereby the bag material folds apart and the bag contents can be emptied quickly, contamination-free and substantially completely.

Optionally, it is provided that the collecting device comprises a collecting funnel.

Optionally, it is provided that a filler neck is mounted on the collecting device and that a shutoff device is provided between the collecting device and the filler neck.

The collecting device, in particular the collecting funnel, may be wedge-shaped or conical. Optionally, the collecting device is designed in such a way that the bag contents exiting the bags is collected by the collecting device and conveyed to a transport device, such as in particular a silo truck, a lorry, a tank wagon, an octabin or big bags, for further manipulation. Optionally, the shutoff device can be moved from a first position, in which the shutoff device closes the collecting device, into a second position, in which the collecting device is open. This may allow filled bags to be emptied even when the transport device arranged under the collecting device or under the filler neck is changed.

When the shutoff device is in its first position, the collecting device can receive or temporarily store the bag contents. If subsequently there is a transport device below the filler neck, the temporarily stored material can be introduced into the transport device by opening the shutoff device.

This may allow the system to continue to operate without interruption while the transport device is being changed. Furthermore, the filling times of a transport device may thereby be reduced, as the bag contents can, for example, be removed from the bags before the arrival of the transport device and can be immediately introduced into the transport device after arrival.

Optionally, it is provided that a filter device, which catches any lost material, is provided below the bag slitting device, that bag material monitoring devices are provided on the bag slitting device to detect the lost bag material, and that the filtering device is designed as a mesh grid, in particular with a mesh size in the range of 5 to 25 mm, preferably 16 mm.

The filter device may, for example, collect the bag material that the lifting device may have lost, whereby contamination of the exiting bag contents can be reduced or substantially prevented.

It may be provided that the filter device is provided with a monitoring device, in particular at least one sensor, which is configured to detect any lost bag material. In particular, the at least one sensor of the monitoring device is designed as a light barrier. In case a contamination is detected, the system may optionally be stopped and the contamination be removed.

Optionally, it is provided that the empty bag deposit comprises an empty bag deposit funnel. Optionally, it is provided that in the area of the empty bag deposit a bag compressing device is provided, which compresses the empty bags.

The empty bag deposit, in particular the empty bag deposit funnel, may be wedge-shaped or conical.

The bag compressing device may be configured to compress the empty bags.

Optionally, it is provided that a pallet gripping device is provided on the lift frame of the manipulation device, and that the pallet gripping device comprises at least one, in particular two, pallet gripper/s.

Optionally, it is provided that the pallet gripping device can be moved from a transport position into an operating position, that, in the operating position, the pallet grippers of the pallet gripping device engage the substantially bag-free pallet for conveying the pallets, and that, in the transport position, the pallet grippers of the pallet gripping device are free of pallets.

The pallet grippers may be arranged on two opposite sides of the lift frame. In particular, the pallet gripping device may comprise two pivotable gripping jaws. The pallet gripping device and the pallet grippers are configured to convey the bag-free pallets from the conveyor belt to the empty pallet deposit on the lift frame without losses.

Optionally, it is provided that the suction device and the compaction device are connected to a negative pressure source and that the manipulation device, the bag gripping device and the pallet gripping device are connected to a compressed air source.

In particular, the system may be provided with a central compressed air source, which is configured to provide compressed air in a range of 3 bar to 10 bar, in particular 5 bar to 8 bar. Optionally, it is provided that the system is configured to carry out the method according to the invention.

Further features according to the invention optionally emerge from the claims, the description of the exemplary embodiments and the figures.

The device according to the invention offers a particular advantage in that it is accommodated on a platform in a very space-saving manner. All elements may be operated by a robot arm. By means of corresponding sensors the device can work largely automatically without being operated.

The invention is now further explained on the basis of exemplary, non-limiting embodiments.

Figure 1:
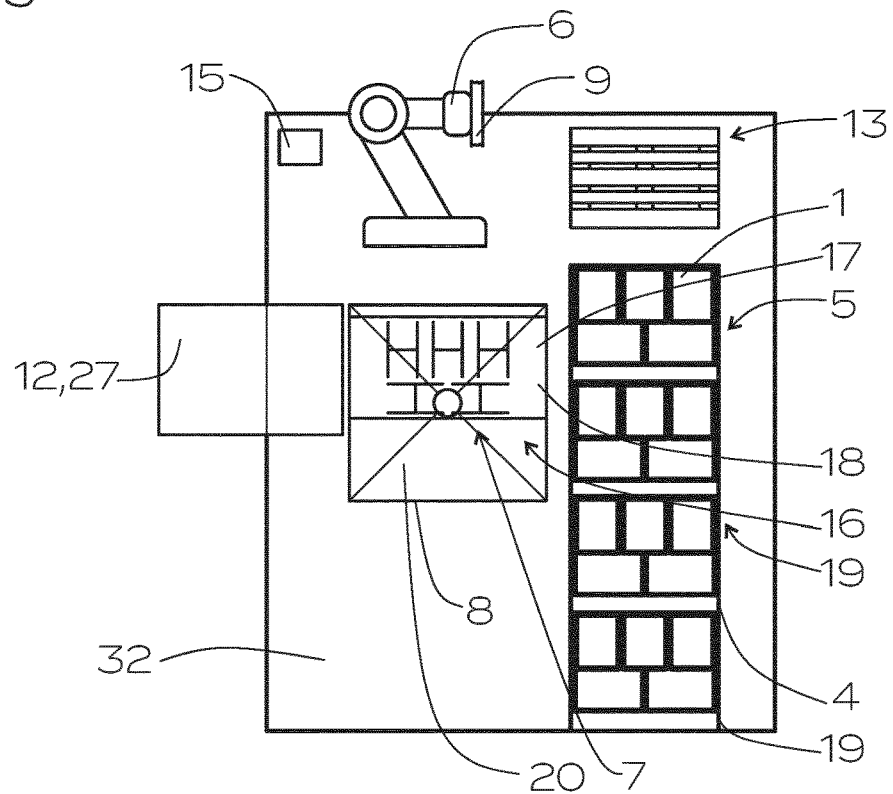
FIG. 1 shows a schematic graphic layout of one embodiment of the device according to the invention.
Figure 4:
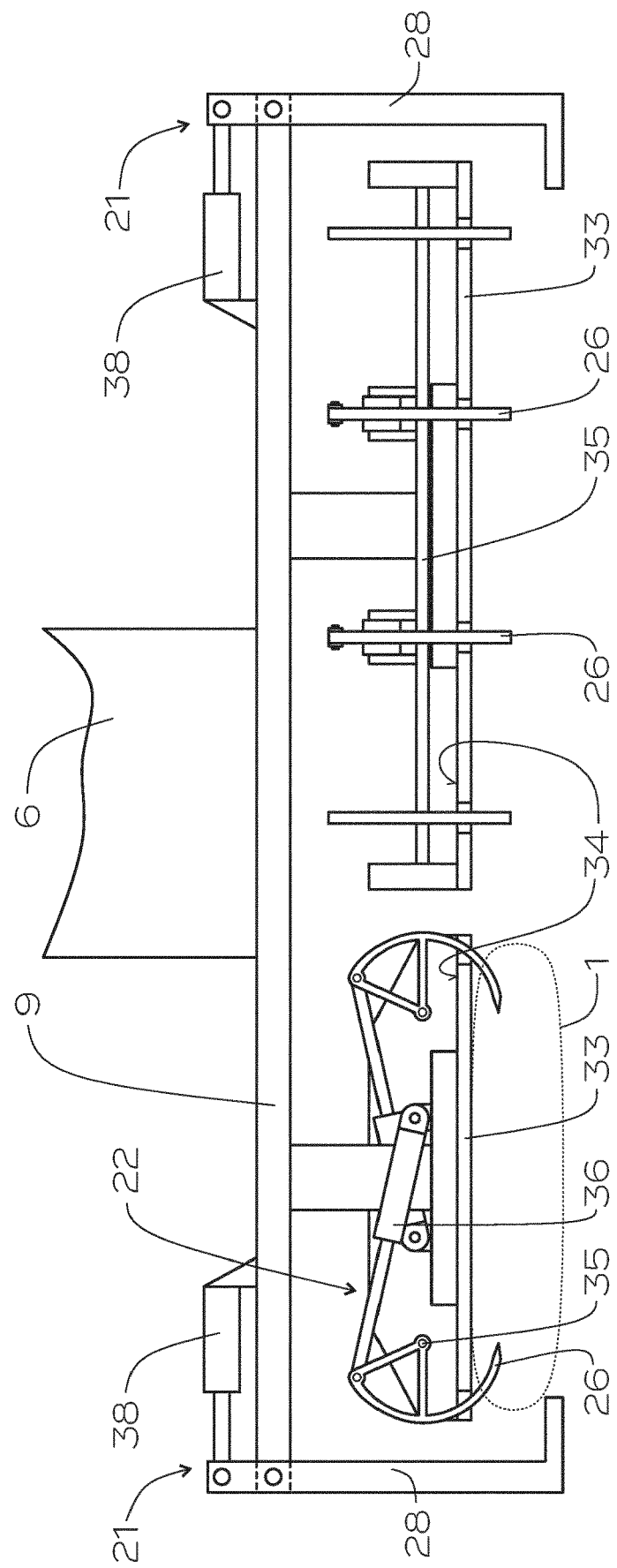
Figure 5:
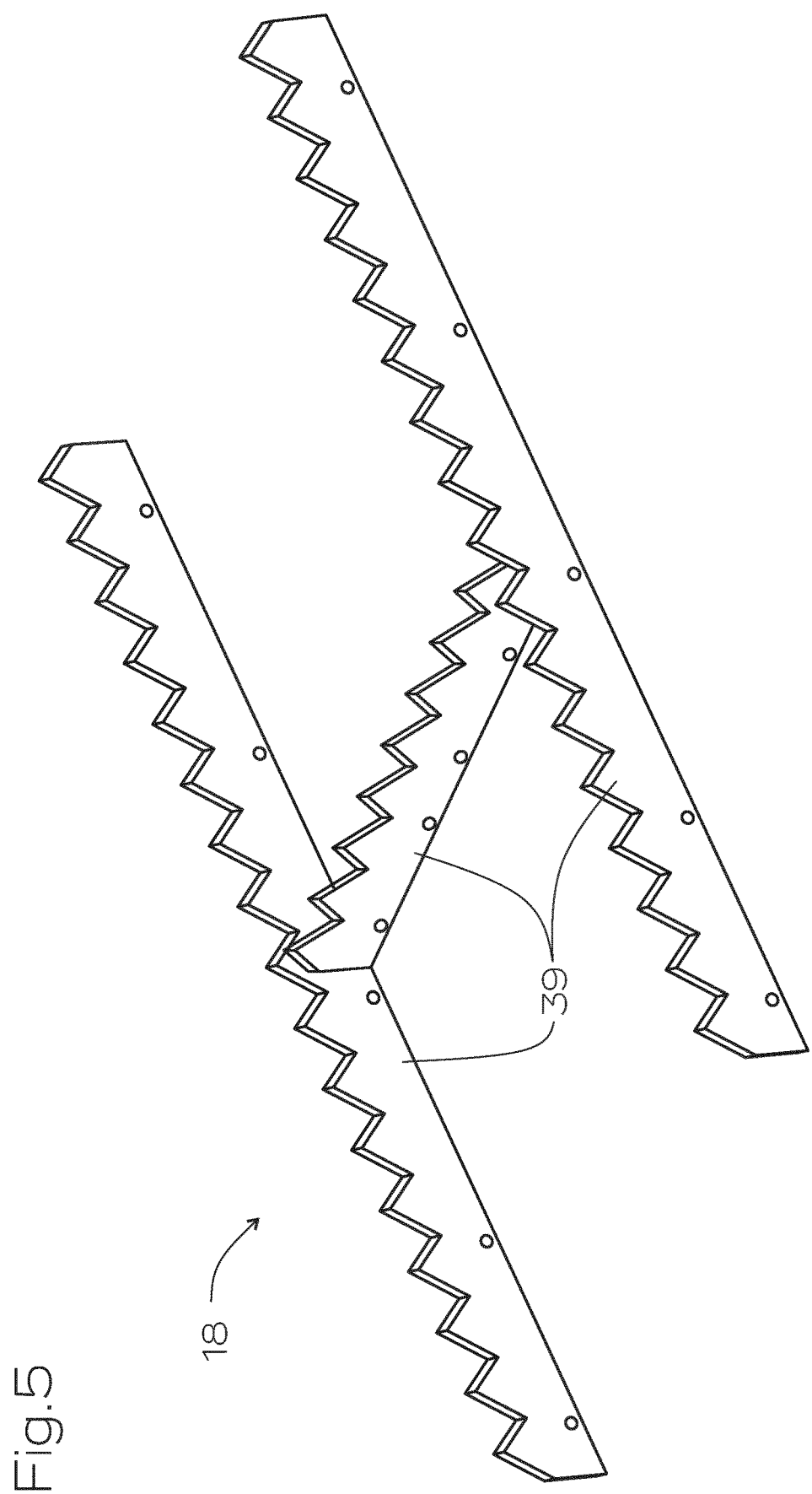
Figure 6:
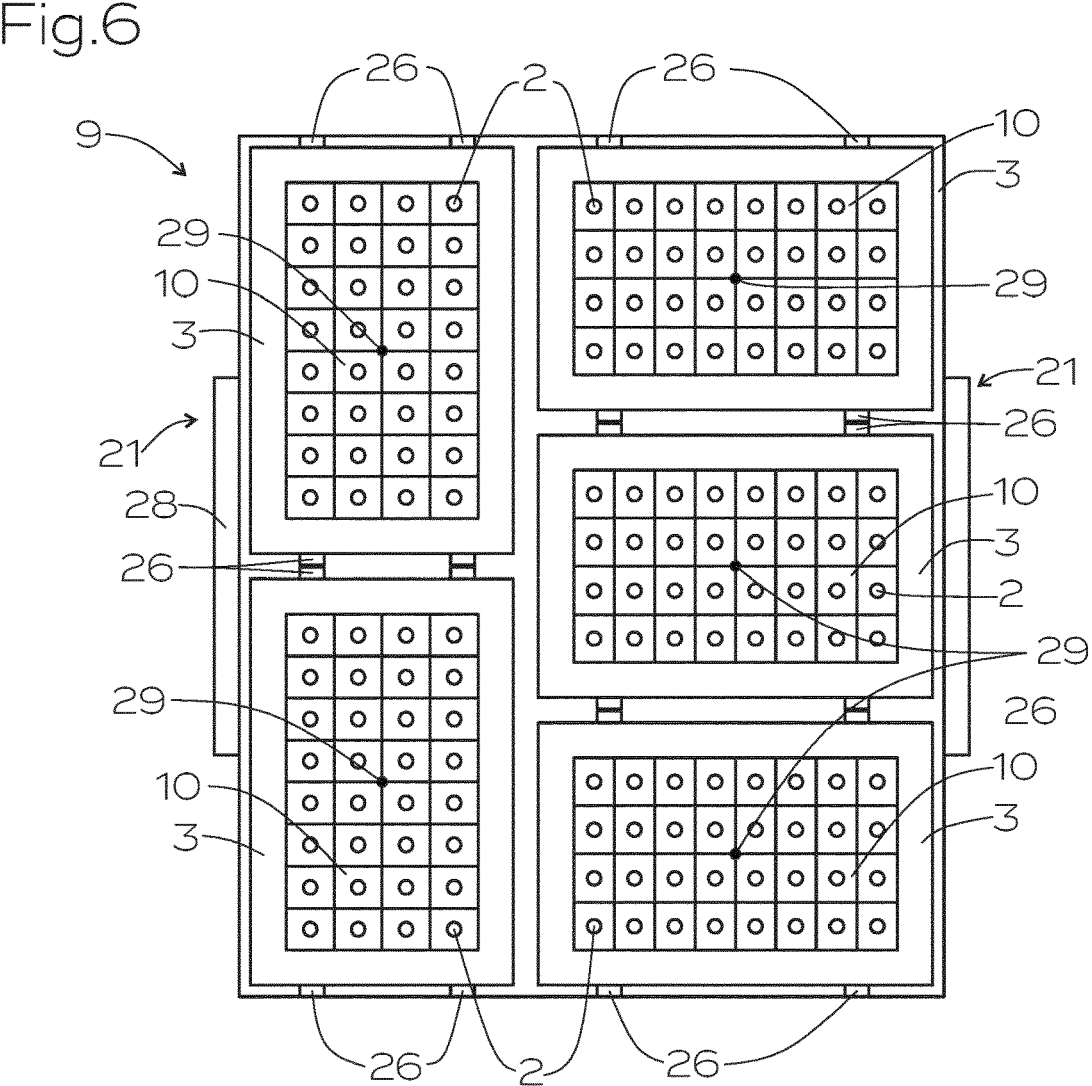
Figure 7:
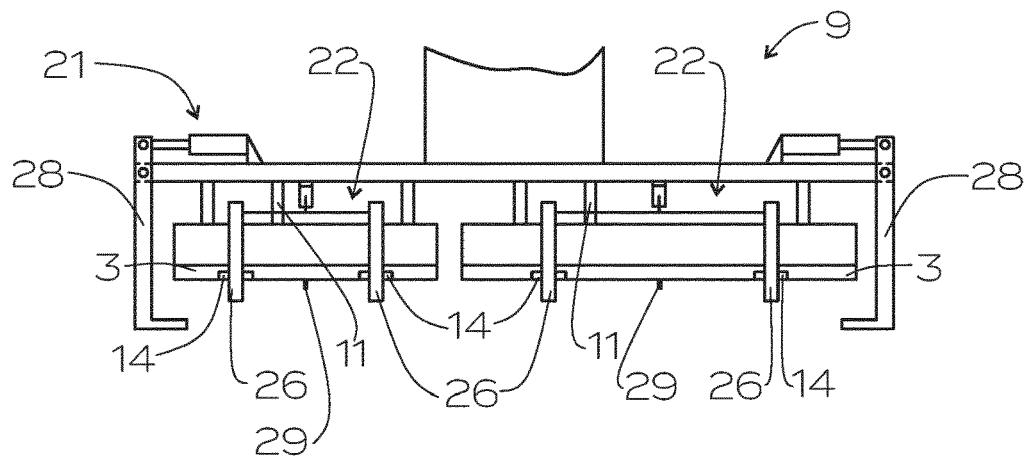

FIG. 4 shows a schematic front view of the lift frame of the manipulation arrangement, FIG. 5 shows an oblique view of the knife arrangement for a bag, FIG. 6 shows a schematic graphic layout of the lift frame of the manipulation device of the system illustrated in FIG. 1, and FIG. 7 shows a schematic graphic front view of the lift frame of the manipulation device of the system illustrated in FIG. 1.

Figure 2:
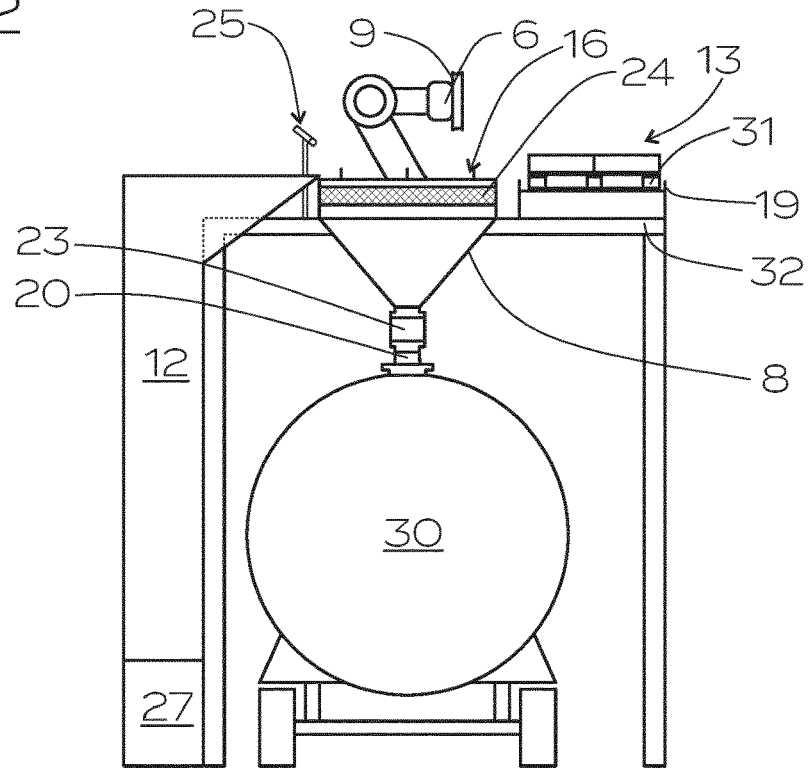
FIG. 2 shows a schematic view of the device illustrated in FIG. 1.

FIG. 1 shows a schematic graphic layout of one embodiment of the system according to the invention. Reference is made to FIG. 2. The bags 1 filled with a free-flowing or flowable material are conveyed on pallets 31 on a conveyor belt along the bag feed track 4 towards a bag pick-up point 5. According to this embodiment, for example, ten layers of five filled bags 1 each are arranged on each pallet 31. A centering device 19, for example in form of a rail, is provided in the area of the conveyor belt for centering the pallets 31. According to this embodiment, the centering device 19 preferably comprises at least one sensor, which detects the presence of pallets 31 and/or filled bags 1.

In the area of the bag pick-up point 5 the filled bags 1 are grasped by the lift frame 9 of the manipulation device 6, wherein the lift frame 9 is only shown broken off in FIGS. 1 and 2. In this embodiment, the manipulation device 6 is, for example, a six-axis robot with the trade name ABB IRB 6620 R. This robot can be moved about six different axes. This robot has a movement radius of 2.2 m and a repetition accuracy of 0.06 mm. The nominal lifting capacity of this robot is 150 kg. The lift frame 9 is a stable steel construction made of a stainless material and is only shown reduced in size in FIGS. 1 and 2; see also FIGS. 3 and 4 below.

An essential feature of the present invention is the compact arrangement of all elements, preferably on a platform 32, which is designed in such a way that any tank truck or other means of transport can drive under the collecting funnel. Furthermore, the elements on the platform 32 are arranged in such a way that the manipulation device 6 can handle the bags and pallets 31 in the correct order. The substantially square arrangement is particularly space-saving, so that the device according to the invention can easily be placed next to or below the other production equipment for the granules or powder.

Figure 3:
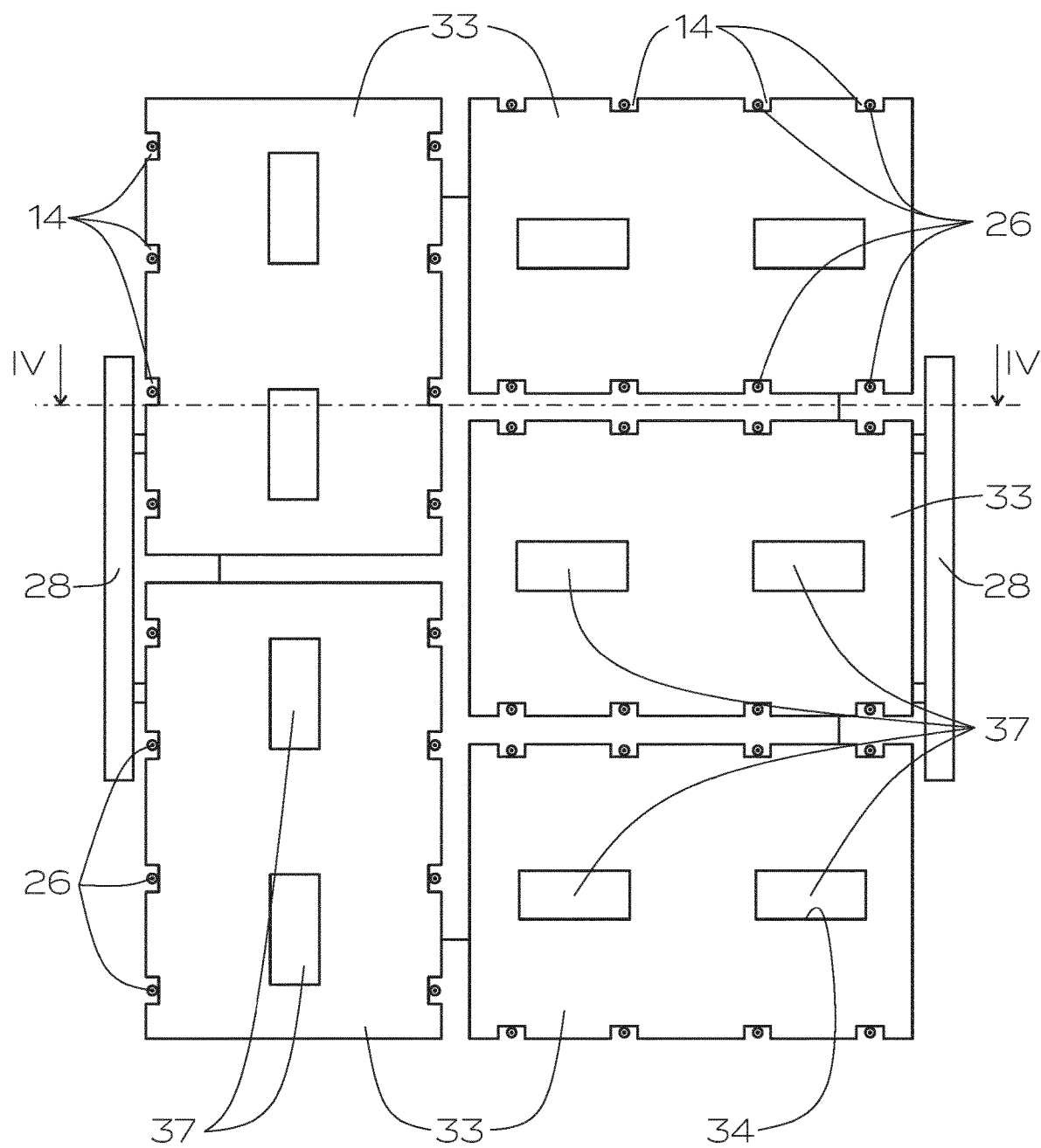
FIG. 3 shows a bottom view of the lift frame.

The filled bags 1 are grasped by means of the lift frame 9, as preferably shown in FIGS. 3 and 4. FIG. 3 shows the bottom view of the lift frame 9 with a view of the supporting surfaces of the bag receiving plates 33. These bag receiving plates 33 are rigid plates, preferably metal plates, and each have a surface dimension, which corresponds to the dimension of the bags. In the present example, five bag receiving plates 33 are provided for receiving five bags. Preferably, the bag receiving plates 33 are in a plane and are moved vertically and horizontally together by the manipulation device 6 (see FIGS. 1 and 4). With one movement of the manipulation device 6, five bags at a time can be grasped, lifted and advanced for processing.

Furthermore, it can be seen in FIG. 3 that the tips of spike-like bag grippers 26 are provided along the longitudinal edges of the bag receiving plates 33, each of which is located in cut-outs in the bag receiving plates 33, the cut-outs serving as a stripping device 14.

Furthermore, in FIG. 3, laterally arranged pallet grippers 28 are also provided, which are intended to grasp the pallets 31 when all the bags have been removed and the pallet 31 is to be transported to the empty pallet deposit 13.

In the present case, the bag receiving plates 33 have, for example, inspection openings 37 in order to be able to carry out work on the rear side, namely the mounting side 34 of the bag receiving plates 33. A further advantage of these inspection openings 37 is that the weight of the bag receiving plates 33 is reduced.

FIG. 4 shows a schematic section according to the line IV-IV in FIG. 3. The schematically indicated manipulation device 6 is connected to the lift frame 9, to the underside of which the bag receiving plates 33 are attached at a distance. On the upper mounting side 34 of the bag receiving plates 33 the elements necessary for gripping the bags are provided. These elements are primarily the bag grippers 26 and the associated actuating shafts 35, around which the arc-shaped bag grippers 26 on each side of the bag can be rotated.

Furthermore, the necessary hydraulic or electric actuating elements 36 are located on the mounting side 34. In the present case, if four bag grippers 26 are provided on each bag side, one actuating element 36, which can move all four bag grippers 26, is sufficient for each bag side. The pallet gripping device 21 is formed by the two pallet grippers 28 and the associated actuating element 38.

In FIG. 4, the bag grippers 26 are shown in a partially extended position. By actuating the actuating elements 36, the bag grippers 26 can be retracted upwards or fully extended downwards.

During operation of the device, the empty lift frame 9 with its bag gripping devices 22 is placed on the top layer of bags of that pallet 31 which is located in the bag pick-up point 5. At the same time, the pallet grippers 28 are swivelled upwards so that they do not interfere with the gripping of the bags. All the bag grippers 26 are pivoted downwards by the actuating elements 36 and engage the bags, whereby the bag material is pierced by the tips of the bag grippers 26.

Preferably, the bag grippers 26 have a round or oval cross section, which ensures that no material is punched out of the bag wall. This prevents contamination of the bag contents by parts of the bag.

Once the bags are held by the bag grippers 26, the manipulation device 6 is lifted with all the bags and moved over the bag slitting device 16 (see FIG. 2). The bag slitting device 16 is located above the funnel-shaped collecting device 8 and comprises the cutting frame 17 and the cutting knife arrangement 18 arranged in this frame.

FIG. 5 shows a preferred cutting knife arrangement 18, the cutting knives 39 of which are arranged in an H-shape. One cutting knife arrangement 18 is provided for each bag.

The filled bags 1 are placed or pressed onto the cutting knife arrangements 18 by the manipulation device 6, whereby the bags are cut open in an H-shape. Consequently, a complete emptying of the bags downwards into the funnel-shaped collecting device 8 occurs. The granules or powder can be sieved through the filter device 24 and pass downwards into the collecting device 8 and from there, for example via the shutoff device 23, into the filler neck 20 of the tank truck 30. The quality of the powder or granules may be checked by means of appropriate sensors and if contamination occurs, the shutoff device 23 may automatically interrupt the further transport of the free-flowing material, for example.

During this process of discharging the free-flowing material, the bag material remains in a cut but otherwise single-piece state. After the emptying process, the lift frame 9 is lifted again with the bag gripping device 22 and the empty bags are moved over the empty bag deposit 12. By retracting the bag grippers 26, the bags are released and fall downwards into the empty bag deposit 12. Optionally, a bag compressing device 27 may be provided to reduce the volume of the empty bags.

The bag grippers 26 are cleaned, in particular in their pointed area, by the stripping device 14 when they are retracted, so that the bag grippers 26 are clean again for the subsequent picking up of a new layer of bags from the bag pick-up point 5.

In the alternative of FIGS. 6 and 7, the grasping of the filled bags 1 is carried out by means of suction devices 10 which, according to this embodiment, each comprise a plurality of suction holes 2. When the lift frame 9 has brought the suction devices 10 into contact with the filled bags 1, a negative pressure is generated via a negative pressure source. The generated negative pressure causes the filled bags 1, in particular the bag material of the filled bags 1, to be drawn in by the suction devices 10 and the filled bags 1 are held against the lift frame 9. The sealing strips 3, which may be made of sponge rubber, for example, reinforce the holding force of the suction device 10.

At the same time, the air contained in the grasped bags is sucked out of the grasped bags by a suction device 11 with the suction mandrel 29, whereby the grasped bags are compressed and compacted. According to this embodiment, one suction device 11 is arranged on the lift frame 9 in the area of each suction device 10. Each suction device 11 comprises a suction mandrel 29, which penetrates into the respective filled bag 1 for sucking out the air. In particular, the bag material of the respective filled bag 1 is pierced by the suction mandrel 29 for suction and the air is removed from the filled bag 1 substantially without any material.

Before the grasped bags are brought into contact with the bag slitting device 16, the bag grippers 26 of a bag gripping device 22 engage the grasped bags, in particular the bag material of the grasped bags. The bag grippers 26 are configured to hold the bag material against the lifting device during and after the emptying of the filled bags 1.

Subsequently, the grasped bags are brought into contact by the manipulation device 6 with a bag slitting device 16 which comprises a cutting frame 17. In this embodiment, the cutting frame 17 comprises five H-shaped cutting knife arrangements 18.

The H-shaped cutting knife arrangements 18 are arranged such that they each contact just one of the grasped bags when the manipulation device 6 brings the grasped bags into contact with the bag slitting device 16. The H-shaped arrangement of the cutting knife arrangements 18 allows the filled bag 1, in particular the bag material, to be cut open in an H-shape, whereby a quick and substantially complete emptying of the filled bags 1 is permitted. The cutting frame 17 and the cutting knife arrangements 18 of the bag slitting device 16 are made of a stainless material, in particular steel or stainless steel.

According to this embodiment, it is provided that the suction mandrel 29 of the suction device 11 is retracted from the filled bag 1 before the filled bags 1 come into contact with the bag slitting device 16. Air can flow into the filled bag 1 through the hole in the bag material formed by the suction mandrel 29 upon piercing the filled bag 1.

By cutting the filled bags 1 open in the area of the discharge point 7, the bag contents in the form of the free-flowing and flowable material exits the bag 1 driven by gravity. According to this embodiment, a funnel-shaped collecting device 8 is provided below the bag slitting device 16, which collects the exiting bag contents.

According to this embodiment, a filter device 24 is provided below the bag slitting device 16. The filter device 24 is configured to filter any impurities, so that substantially only the bag contents, i.e. the free-flowing and flowable material, can pass through the filter device 24. According to this embodiment, the filter device 24 is formed of a grid with a mesh size of 16 mm. Furthermore, the filter device 24 comprises bag material monitoring devices 25, in particular light barriers or cameras, whereby any lost bag material on the filter device 24 is detected.

The bag material, which is substantially free of bag contents, grasped by the bag grippers 26 is conveyed to an empty bag deposit 12 after the filled bags 1 have been emptied. According to this embodiment, it is provided that a bag compressing device 27 is provided below the empty bag deposit 12, which compresses the bag material.

When all bags of a pallet 31 have been processed, the bag-free pallet 31 is grasped by the pallet grippers 28 of the pallet gripping device 21 and conveyed to the empty pallet deposit 13. Then, the pallet 31 following this pallet 31 on the conveyor belt may be conveyed towards the bag pick-up point 5 by the conveyor belt.

According to this embodiment, a central compressed air source 15 is provided, to which the manipulation device 6, the bag gripping device 22 and the pallet gripping device 21 are connected. The compressed air source 15 is configured to provide compressed air in the range of 5 bar to 8 bar.

FIG. 2 shows a schematic graphic front view of the system illustrated in FIG. 1. The features of the embodiment according to FIG. 2 may preferably correspond to the features of the embodiment according to FIGS. 1, 3 and 4.

According to this embodiment, a shutoff device 23 is arranged below the collecting device 8 and a filer neck 20 is arranged below the shutoff device 23. The collecting device 8, the shutoff device 23 and the filler neck 20 are configured to convey the bag contents of the filled bags 1 into a transport device 30, such as a silo truck. According to this embodiment, the collecting device 8 is designed as a conical collecting funnel.

The shutoff device 23 is configured to close the collecting device 8. The closing of the collecting device 8, in particular of the collecting funnel, allows the system to be operated without interruption. That is, the filled bags 1 can also be emptied when no transport device 30 is arranged below the filler neck 20. The bag material can be temporarily stored in the collecting funnel of the collecting device 8 and introduced into the transport device 30 at a later time. This allows the system to be operated even when no transport device 30 is arranged below the filler neck 20.

In an embodiment not shown, the filler neck 20 is directly connected to the collecting device 8, i.e. no shutoff device 23 is interposed.

FIG. 3 shows a schematic graphic layout of the lift frame 9 of the manipulation device 6 of the system illustrated in FIG. 1. The features of the embodiment according to FIG. 3 may preferably correspond to the features of the embodiments according to FIG. 1 and/or FIG. 2.

According to this embodiment, five suction devices 10 with the plurality of suction holes 2 are arranged on the lift frame 9. Four bag grippers 26 of the bag gripping device 22 are provided in the area of each of the suction devices 10.

FIG. 4 shows a schematic graphic layout of the lift frame 9 of the manipulation device 6 of the system illustrated in FIG. 1. The features of the embodiment according to FIG. 4 may preferably correspond to the features of the embodiments according to FIG. 1, FIG. 2 and/or FIG. 3.

For better visibility, the pallet grippers 28 of the pallet gripping device 21 arranged on the lift frame 9 are shown in their operating position. In this position, the pallet grippers 28 can engage a bag-free pallet 31 and convey it to the empty pallet deposit 13. To release the pallet 31, the pallet grippers 28 are moved into their transport position in the area of the empty pallet deposit 13, whereby the pallet 31 held against the lift frame 9 falls towards the ground by gravity.

According to this embodiment, the bag grippers 26 of the bag gripping device 22 are hook-shaped and are shown in their transport position. That means that the bag grippers 26 are arranged behind the stripping device 14 without any bag material. Only when the bag grippers 26 are moved into their operating position do the bag grippers 26 engage the bag material. This allows the bag material to be held against the lift frame 9 during and after the emptying of the filled bags 1 and to be conveyed to the empty bag deposit 12 after emptying. To release the bag material, the bag grippers 26 are moved from their operating position into their transport position in the area of the empty bag deposit 12, whereby the bag material held against the lift frame 9 falls towards the collecting device 8 by gravity.

LIST OF REFERENCE NUMBERS

1 Filled bag
2 Suction holes
3 Sealing strip
4 Bag feed track
5 Bag pick-up point
6 Manipulation device
7 Discharge point
8 Collecting device
9 Lift frame
10 Suction device
11 Suction device
12 Empty bag deposit 13 Empty pallet deposit
14 Stripping device
15 Compressed air source
16 Bag slitting device
17 Cutting frame
18 Cutting knife arrangement
19 Centering device
20 Filler neck
21 Pallet gripping device
22 Bag gripping device
23 Shutoff device
24 Filter device
25 Bag material monitoring device
26 Bag gripper
27 Bag compressing device
28 Pallet gripper
29 Suction mandrel
30 Transport device/Tank truck
31 Pallet
32 Platform
33 Bag receiving plate
34 Mounting side
35 Actuating shaft
36 Actuating element
37 Inspection opening
38 Actuating element (of
the pallet gripper)
39 Cutting knife

The invention claimed is:

1. A device for handling dust-tight and substantially air-tight bags (1) filled with free-flowing or flowable materials and for separating the bag material from the contents of said bags (1) above a collecting device (8),
characterized in that the device comprises
a bag teed track (4) with a bag pick-up point (5),
a manipulation device (6) with a lift frame (9) for grasping the filled bags (1),
a bag slitting device (16) for opening the filled bags (1),
a collecting device (8) for collecting the contents of the bags,
an empty bag deposit (12), and
an empty pallet deposit (13); and
characterized
in that a filter device (24), which collects any lost material, is provided below the hag slitting device (16),
in that bag material monitoring devices (25) are provided on the bag slitting device (16) to detect the lost bag material,
and in that the filter device (24) is designed as a mesh grid, in particular having a mesh size in the range of 5 to 25 mm, preferably 16 mm.

2. A device for handling dust-tight and substantially air-tight bags (1) filled with free-flowing or flowable materials and for separating the bag material from the contents of said bags (1) above a collecting device (8),
characterized in that the device comprises
a bag feed track (4) with a bag pick-up point (5),
a manipulation device (6) with a lift frame (9) for grasping the filled bags (1),
a bag slitting device (16) for opening the filled bags (1),
a collecting device (8) for collecting the contents of the bags,
an empty bag deposit (12), and
an empty pallet deposit (13); and
characterized
in that a pallet gripping device (21) is provided on the lift frame (9) of the manipulation device (6),
and in that the pallet gripping device (21) comprises at least one, in particular two, pallet gripper/s (28).

3. The device according to claim 2, characterized
in that the pallet gripping device (21) can be moved from a transport position into an operating position,
in that, in the operating position, the pallet grippers (28) of the pallet gripping device (21) engage the substantially bag-free pallet (31) for transporting the pallets (31),
and in that, in the transport position, the pallet grippers (28) of the pallet gripping device (21) are free of pallets.

4. A device for handling dust-tight and substantially air-tight bags (1) filled with free-flowing or flowable materials and for separating the bag material from the contents of said bags (1) above a collecting device (8),
characterized in that the device comprises
a bag feed track (4) with a bag pick-up point (5),
a manipulation device (6) with a lift frame (9) for grasping the filled bags (1),
a bag slitting device (16) for opening the filled bags (1),
a collecting device (8) for collecting the contents of the bags,
an empty bag deposit (12), and
an empty pallet deposit (13); and
characterized in that the device can be arranged or is arranged on a platform (32) together with the bag feed track (4), the bag pick-up point (5), the manipulation device (6), the bag slitting device (16), the collecting device (8), the empty bag deposit (12) and the empty pallet deposit (13).

5. The device according to claim 4, characterized in that the platform (32) is configured to allow a transport device (30), in particular a tank truck, to move into and through it.

6. The device according to claim 2, characterized in that the lift frame (9) has a number of bag gripping devices (22), which corresponds to the number of bags (1) to be grasped at a time.

7. The device according to claim 6, characterized in that the lift frame (9) and the bag gripping devices (22) of the lift frame (9) are configured to grasp the filled bags (1) and in that hook-shaped bag grippers (26) are provided for each bag (1), and characterized in that the bag gripping devices (22) each have a respective bag receiving plate (33), which corresponds to the outer dimensions of the bags (1), on the mounting side (34) of which are arranged an actuating shaft (35) for the connection to the manipulation device (6) and actuating elements (36) for the bearing and movement of the bag grippers (26) and the pallet gripping device (21).

8. The device according to claim 7, characterized in that the bag receiving plates (33) have inspection openings (37).

9. The device according to claim 7, characterized in that cut-outs, which act as stripping devices (14), are provided on the edges of the bag receiving plate (33) for the passage of the bag grippers (26).

10. The device according to claim 4, characterized in that a filler neck (20) is mounted on the collecting device (8) and in that a shutoff device (23) is provided between the collecting device (8) and the filler neck (20).

11. The device according to claim 2, characterized in that a filler neck (20) is mounted on the collecting device (8) and in that a shutoff device (23) is provided between the collecting device (8) and the filler neck (20).

12. The device according to claim 1, characterized in that a filler neck (20) is mounted on the collecting device (8) and in that a shutoff device (23) is provided between the collecting device (8) and the tiller neck (20).

13. The device according to claim 1, characterized in that the lift frame (9) and bag gripping devices (22) of the lift frame (9) are configured to grasp the filled bags (1) and in that hook-shaped bag grippers (26) are provided for each bag (1) and characterized in that the bag gripping devices (22) each have a respective bag receiving plate (33), which corresponds to the outer dimensions of the bags (1), on the mounting side (34) of which are arranged an actuating shaft (35) for the connection to the manipulation device (6) and actuating elements (36) for the bearing and movement of the bag grippers (26) and the pallet gripping device (21).

14. The device according to claim 13, characterized in that the bag receiving plates (33) have inspection openings (37).

15. The device according to claim 13, characterized in that cut-outs, which act as stripping devices (14), are provided on the edges of the bag receiving plate (33) for the passage of the bag grippers (26).

16. The device according to claim 4, characterized in that the lift frame (9) and bag gripping devices (22) of the lift frame (9) are configured to grasp the filled bags (1) and in that hook-shaped bag grippers (26) are provided for each bag (1) and characterized in that the bag gripping devices (22) each have a respective bag receiving plate (33), which corresponds to the outer dimensions of the bags (1), on the mounting side (34) of which are arranged an actuating shaft (35) for the connection to the manipulation device (6) and actuating elements (36) for the bearing and movement of the bag grippers (26) and the pallet gripping device (21).

17. The device according to claim 16, characterized in that the hag receiving plates (33) have inspection openings (37).

18. The device according to claim 16, characterized in that cut-outs, which act as stripping devices (14), are provided on the edges of the bag receiving plate (33) for the passage of the hag grippers (26).

\* \* \* \* \*